United States Patent
Merino Vazquez et al.

(10) Patent No.: US 11,758,498 B2
(45) Date of Patent: *Sep. 12, 2023

(54) METHOD AND APPARATUS FOR MANAGING MACHINE TYPE COMMUNICATION DEVICES IN AN ACCESS NETWORK

(71) Applicant: Telefonaktiebolaget LM Ericsson (publ), Stockholm (SE)

(72) Inventors: Emiliano Merino Vazquez, Madrid (ES); Luis Miguel Almaraz Valdes, Galapagar (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,235

(22) Filed: Aug. 23, 2022

(65) Prior Publication Data

US 2023/0013605 A1  Jan. 19, 2023

Related U.S. Application Data

(63) Continuation of application No. 17/268,089, filed as application No. PCT/IB2019/056850 on Aug. 12, 2019, now Pat. No. 11,463,977.

(30) Foreign Application Priority Data

Aug. 13, 2018  (EP) .................................... 18382609

(51) Int. Cl.
*H04W 4/00* (2018.01)
*H04W 60/00* (2009.01)
(Continued)

(52) U.S. Cl.
CPC ............. *H04W 60/00* (2013.01); *H04W 4/50* (2018.02); *H04W 4/70* (2018.02); *H04W 8/22* (2013.01); *H04W 48/02* (2013.01)

(58) Field of Classification Search
CPC ......... H04W 60/00; H04W 4/70; H04W 4/50; H04W 8/22; H04W 48/02
(Continued)

(56) References Cited

U.S. PATENT DOCUMENTS 9,094,790 B2  7/2015  Foti et al.
2013/0017827 A1  1/2013  Muhanna et al.
(Continued)

OTHER PUBLICATIONS

3GPP, "3GPP TS 22.368 V14.0.0", 3rd Generation Partnership Project; Technical Specification Group Services and System Aspects; Service requirements for Machine-Type Communications (MTC); Stage 1 (Release 14), Mar. 2017, pp. 1-26.
(Continued)

*Primary Examiner* — Mark G. Pannell
(74) *Attorney, Agent, or Firm* — Murphy, Bilak & Homiller, PLLC

(57) ABSTRACT

A wireless communication device, WCD, is associated with multiple Machine Type Communication (MTC) applications, each application corresponding to a respective MTC Service Provider (SP) network that identifies it using a corresponding "external identifier". The involved MTC SP networks use the same common identifier to request a wireless communication network, WCN, used to access the WCD to undertake certain configuration actions with respect to the WCD. The WCD may belong to a group of WCDs, in which case the common identifier is an external group identifier. The WCN advantageously determines which MTC SP network is the "requesting provider" for a given requested configuration action, and it restricts the configuration action within the WCN to the requesting provider.

10 Claims, 8 Drawing Sheets

(51) Int. Cl.
  *H04W 4/70* (2018.01)
  *H04W 4/50* (2018.01)
  *H04W 8/22* (2009.01)
  *H04W 48/02* (2009.01)

(58) Field of Classification Search
  USPC .................................................... 455/435.1
  See application file for complete search history.

(56) References Cited

U.S. PATENT DOCUMENTS

| | | |
|---|---|---|
| 2013/0083653 A1 | 4/2013 | Jain et al. |
| 2013/0182644 A1 | 7/2013 | Kim et al. |
| 2013/0196630 A1 | 8/2013 | Ungvari et al. |
| 2013/0315155 A1 | 11/2013 | Foti et al. |
| 2014/0086144 A1 | 3/2014 | Foti et al. |
| 2020/0084744 A1 | 3/2020 | Youn et al. |

OTHER PUBLICATIONS

3GPP, "3GPP TS 23.682 V15.5.0", 3rd Generation Partnership Project; Technical Specification Group Services and System Aspects; Architecture enhancements to facilitate communications with packet data networks and applications (Release 15), Jun. 2018, pp. 1-125.

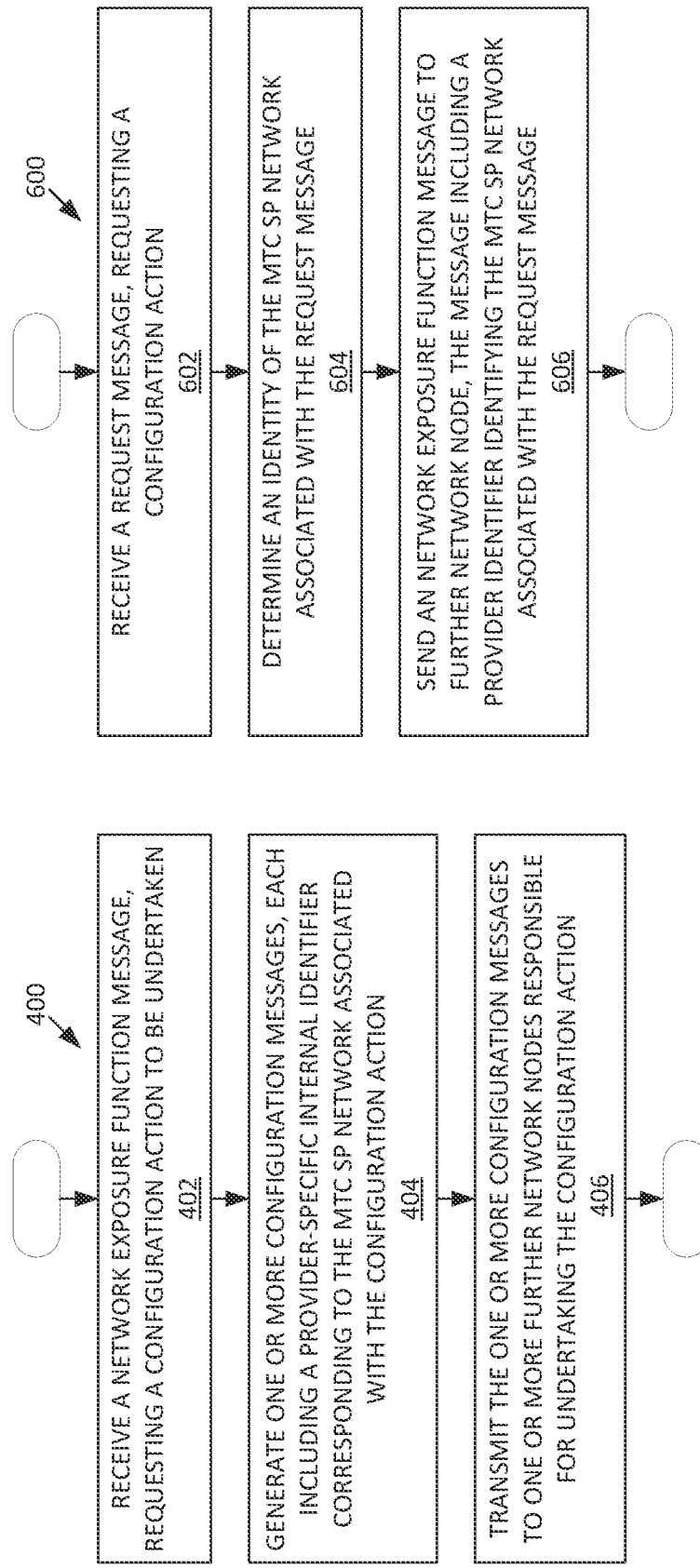

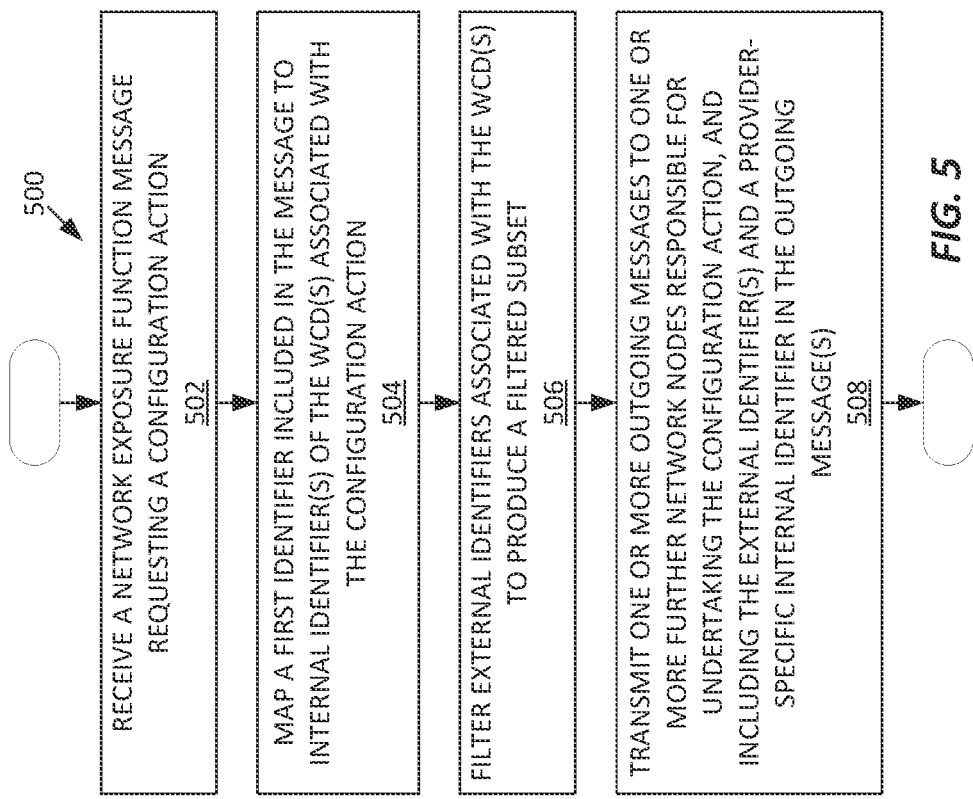

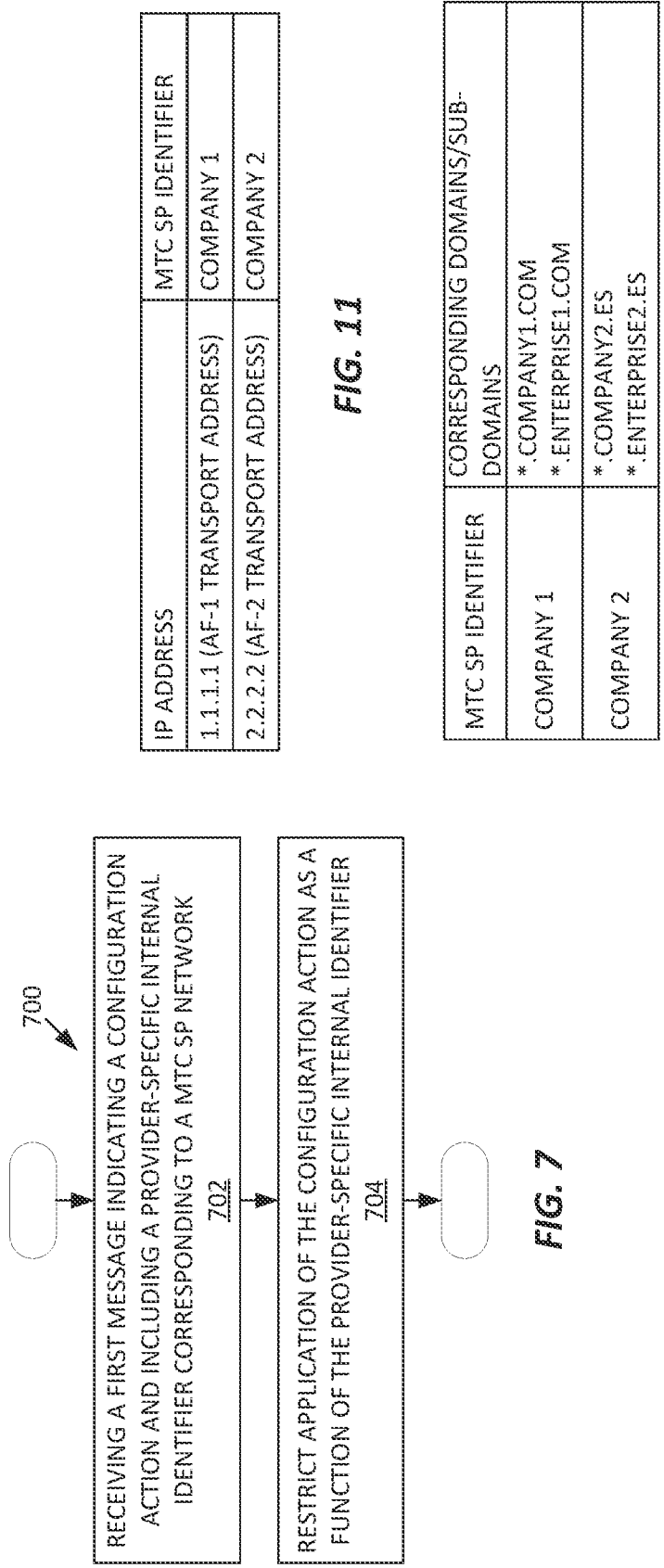

METHOD AND APPARATUS FOR MANAGING MACHINE TYPE COMMUNICATION DEVICES IN AN ACCESS NETWORK

RELATED APPLICATIONS

This application is a continuation of U.S. Ser. No. 17/268,089 filed 12 Feb. 2021, which is a U.S. National Phase Application of PCT/IB2019/056850 filed 12 Aug. 2019, which claims foreign priority to EP18382609.8 filed 13 Aug. 2018. The entire contents of each aforementioned application is incorporated herein by reference.

TECHNICAL FIELD

The present invention generally relates to Machine Type Communication (MTC) devices, such as may be used in Internet of Things (IoT) applications, and particularly relates to the management of MTC devices in an access network, such as a cellular or other wireless communication network that provides MTC Service Provider (SP) networks with access to the MTC devices and related network event information.

BACKGROUND

Machine Type Communication (MTC) services enable various monitoring and automation functions via MTC "devices." For detailed e ample information, see the Technical Specification (TS) promulgated by the Third Generation Partnership Project (3GPP) denoted as 3GPP TS 22.368, "Service Requirements for Machine Type Communications (MTC); Stage 1". Further, see 3GPP TS 23.682, "Technical Specification Group Services and System Aspects; Architecture enhancements to facilitate communications with packet data networks and applications".

An example MTC device comprises a Wireless Communication Device (WCD) that is configured to access and communicate through an "access network", such that one or more MTC applications executed by the WCD are communicatively coupled to one or more MTC Service Provider (SP) networks via the access network. In an equivalent variant, separate processing and interface systems or subsystems each provide respective MTC functions, with the separate systems or subsystems sharing a common communications module for interfacing to the access network. In both cases, the arrangement appears as a single WCD with respect to the involved access network, although each distinct MTC application or function interfaced to the access network via the WCD may be regarded as a separate "MTC device" by the associated MTC SP network. Thus, in a single WCD there may exist several MTC devices, at least in a logical sense, because each MTC SP "sees" the WCD as the MTC device associated with its MTC SP network.

Example access networks include Third Generation Partnership Project (3GPP) cellular communication networks or other Public Land Mobile Networks (PLMNs), and the WCD requires corresponding access-network credentials. The access-network credentials may be provided under business agreements struck between the access network operator and the involved MTC SP(s). The access-network credentials are tied to a secure identifier associated with the WCD, such as an International Mobile Subscriber Identifier (IMSI) or a Subscriber Permanent Identifier (SUPI). Because of the security sensitivities associated with such identifiers, they are used as "internal identifiers" within the access network but typically are not shared externally, i.e., they are not usually shared with the MTC SP networks.

Thus, a WCD that hosts or is otherwise associated with one or more distinct MTC applications or functions—"MTC applications" hereafter, for brevity—engages in a first kind of signaling that is distinct from its MTC-related activities. Namely, the WCD supports access-network signaling based on the internal identifier of the WCD, for establishing communication sessions over the air interface between the WCD and the access network. The established communication sessions are then used to convey MTC signaling between the respective MTC applications and the supporting MTC SP networks. To differentiate the MTC signaling associated with the different MTC applications, each distinct MTC application is identified with an "external identifier", so named because it is used externally by the associated MTC SP network to identify the WCD to the access network. More particularly, the external identifier identifies a particular one of the MTC devices that is hosted by the WCD or is otherwise communicatively reachable through the WCD.

Information stored in the access network, such as subscriber profile data maintained for WCDs, links the internal identifier of a given WCD to each of the external identifiers associated with the WCD. A given WCD may also be associated with an "external group identifier" and a corresponding "internal group identifier". For example, WCDs associated with MTC applications may be logically grouped by geographic area, or by deployment scenario, e.g., in-vehicle deployments supporting Vehicle-to-Everything (V2X) applications, or in-home residential deployments supporting various "smart metering" or "smart home" applications. The external group identifier provides a convenient mechanism for an MTC SP network to send control or request, messages towards the access network that target a potentially large number of WCDs associated with an MTC application that is executing on the respective WCDs and linked to the MTC SP network.

The access network translates or maps the external group identifier to the corresponding internal group identifier, based on stored association information. In turn, the internal group identifier is logically linked to all of the internal identifiers of the WCDs that belong to the defined group in question. However, while the conventional access network has no difficulty in identifying the group of WCDs targeted by a message tagged with an external group identifier, it, has no mechanism for tailoring the group-related operation implicated by the message to the particular MTC SP network that is associated with the message.

Because the WCDs in the group may each be associated with multiple MTC SP networks and because each of the MTC SP networks uses the same external group identifier to identify the group of WCDs, the conventional access network lacks any ready mechanism for making group-based configurations or taking group-based configuration actions that are restricted to an individual one or ones of the MTC SP networks. Similar problems arise in restricting configuration actions intended for a specific MTC SP, in cases where a WCD is identified by a telephone number or other common identifier that is logically linked to multiple external identifiers.

SUMMARY

A wireless communication device (WCD) is associated with multiple Machine Type Communication (MTC) applications, each application corresponding to a respective MTC Service Provider (SP) network that identifies it using a corresponding "external identifier". The involved MTC SP networks use the same common identifier to request a wireless communication network (WCN) used to access the WCD to undertake certain configuration actions with respect to the WCD. The WCD may belong to a group of WCDs, in which case the common identifier is an external group identifier. The WCN advantageously determines which MTC SP network is the "requesting provider" for a given requested configuration action, and it restricts the configuration action within the WCN to the requesting provider. Consequently, the configuration action affects the behavior of the WCN only for the requesting provider and not for the other MTC SP networks that use the same common identifier to request configuration actions.

For example, a node operative as a Network Exposure Function (NEF) receives a configuration action request from an Application Function (AF) or Application Server (AS) node that is associated with a particular MTC SP network. The configuration action request includes an external identifier that is commonly used by more than one MTC SP network to identify a particular WCD or group of WCDs that are accessed by the respective MT SP network via the WCN. The NEF determines the identity of the MTC SP associated with the request and it identifies the MTC SP network associated with the request in a corresponding message that it passes along to a node that is operative to determine the internal identifier(s) of the one or more WCDs associated with the external identifier.

For example, the NEF sends the corresponding message to a Unified Data Management (UDM) node or other node having access to stored mapping information that links the external identifier to the internal identifier(s) of the one or more WCDs associated with the external identifier. In turn, the UDM node uses the provider identifier provided by the NEF to determine a provider-specific internal identifier that identifies the one or more WCDs by linking to their individual internal identifier e.g., IMSIs and links to or otherwise provides the UDM node with a mechanism for filtering all of the external identifiers associated with the one or more WCDs, to obtain the subset of external identifiers that is associated with the MTC SP network identified by the provider identifier.

To initiate application of the configuration action, the UDM node sends one or more outgoing messages, e.g., configuration messages, to one or more further nodes that are responsible for applying the configuration action e.g., undertaking one or more configuration operations implied by the action. The further node(s) are, for example, one or more Access and Mobility management Functions (AMFs) that are "serving" or otherwise responsible for the one or more WCDs. The configuration message(s) include, for example, a provider-specific internal identifier associated with the MTC SP network that requested the configuration action—the "requesting provider".

In turn, each of the AMFs use the provider-specific internal identifier restrict application of the configuration action to the requesting provider. Here, "restricting" application of the configuration action means that the AMF or any other nodes involved in undertaking the configuration action limits the effects of the configuration action so that the behavior of the WCN does not change with respect to the other MTC SP networks that are also associated with the same WCD(s). For example, if the configuration action initiates detection and reporting of a certain type of network event involving the WCD(s), the reporting will include the external identifiers associated with the requesting provider.

Similarly, if the control action discontinues or modifies other network event exposure operations, those modifications will be applied as regards the requesting provider and not the other MTC SP providers associated with the involved WCDs.

An example method of operation by a network node of a WCN comprises receiving a network exposure function message, requesting a configuration action to be undertaken in the WCN with respect to one or n e WCDs and identifying, as a requesting provider, one in a set of two or more MTC SP networks that are commonly associated with the one or more WCDs and external to the WCN. The method further includes generating one or more configuration messages corresponding to the network exposure function message, each configuration message including a provider-specific internal identifier linked to the requesting provider. Still further, the method includes transmitting the one or more configuration messages to one or more further network nodes responsible for undertaking the configuration action, thereby restricting application of the configuration action by the one or more further network nodes to the requesting provider.

In a related example, a network node configured for operation in a wireless communication network comprises communication interface circuitry for communicating with one or more other nodes in or communicatively coupled to the wireless communication network. The network node further includes processing circuitry operatively associated with the communication interface circuitry and configured to carry out method detailed immediately above. For example, the network node operates as a Unified Data Management (UDM) node and the processing circuitry is configured to carry out operations that collectively implement the method described immediately above.

In another example, a method of operation by a network node of a WCN includes receiving a network exposure function message requesting a configuration action to be undertaken by the WCN on behalf of a specified one among a set of two or more MTC SP networks and with respect to one or more WCDs, as identified by a first identifier included in the message. The method further includes mapping, according to stored mapping information, the first identifier to one or more internal identifiers, each internal identifier used to identify a corresponding one of the one or more WCDs within the WCN for authentication and access control. Each internal identifier has a corresponding set of external identifiers, with each external identifier in the corresponding set of external identifiers corresponding to one of the MTC SP networks in the set of two or more MTC SP networks and used by the corresponding MTC SP network to identify a corresponding MTC application accessible via the WCD, when using the WCN as an access network between the WCD and the corresponding MTC SP network.

Still further, the method includes filtering the one or more sets of external identifiers corresponding to the one or more internal identifiers, to produce a filtered subset that includes only the external identifiers that correspond to the specified MTC SP network and are therefore referred to as involved external identifiers. The method also includes transmitting one or more outgoing messages, e.g., configuration messages, to one or more further network nodes that are associated with implementing the configuration action. Each outgoing message indicates one or more of the involved external identifiers and a provider-specific internal identifier, to thereby enable the further network node that receives the outgoing message to apply the configuration action only for the specified MTC SP network and thereby prevent the configuration action from affecting behavior of the WCN with respect to the other MTC SP network(s) in the set of two or more MTC SP networks, for the one or more WCDs.

In a related example, a network node configured for operation in a WCN comprises communication interface circuitry for communicating with one or more other nodes in or communicatively coupled to the WCN and processing circuitry operatively associated with the communication interface circuitry and configured to carry out the method described immediately above. For example, the network node comprises an Access and Mobility Function (AMF) that is responsible for applying the configuration action, with respect to at least one of the involved WCDs. The network node also may be configured to carry out corresponding network behaviors, such as detecting and reporting network events according to configuration details associated with the configuration action.

In yet another example, a method of operation by a WCN comprises receiving a request message incoming from a requesting node in or communicatively linked to the WCN, the message requesting a configuration action to be undertaken by the WCN on behalf of an unspecified one among a set of two or more MTC SP networks, with respect to one or more WCDs identified by a first identifier included in the message. The method further includes determining an identity of the MTC SP network associated with the message, based on further stored mapping information that maps at least one of authentication credentials and network address information for the requesting node to a provider identifier identifying a corresponding one of the two or more MTC SP networks in the set of two or more SP networks.

Still further, the method includes sending a network exposure function message to a further network node that is responsible for identifying the one or more WCDs from the first identifier, for initiation of the configuration action. The network exposure function message indicates the configuration action and the first identifier, and further indicates the provider identifier to thereby enable the further network node to generate a corresponding configuration message for applying the configuration action only for the MTC SP network corresponding to the provider identifier and not for the remaining one or more MTC SP networks.

In a related example, a network node configured for operation in a WCD includes communication interface circuitry for communicating with one or more other nodes in or communicatively coupled to the WCN, and further includes processing circuitry operatively associated with the communication interface circuitry and configured to carry out the method described immediately above. For example, the network node comprises a node operative as a Network Exposure Function (NEF) that is communicatively coupled to an Application Function (AF) or Application Server (AS) node that sends the request for the configuration action and is associated with one of the MTC SP networks. The NEF, in fact, may be coupled to AF/AS nodes and may have access to information that it uses to identify which MTC SP network is associated with each such AF/AS node.

In a further example, a method of operation a network node configured for operation in a WCN includes receiving a first message from another network node, the first message indicating a configuration action to be undertaken by the network node with respect to one or more wireless communication devices (WCDs). Here, the configuration action relates to a network exposure function and the first message includes a provider-specific internal identifier corresponding to one in a set of two or more MTC SP networks that are commonly associated with the one or more WCDs and external to the WCN. The method further includes restricting application of the configuration action as a function of the provider-specific internal identifier, such that the configuration action affects the behavior of the WCN with respect to the MTC SP network corresponding to the provider-specific internal identifier but not with respect to the one or more other MTC SP networks in the set of two or more MTC SP networks.

In a related example, a network node configured for operation in a WCN comprises communication interface circuitry for communicating with one or more other nodes in or communicatively coupled to the WCN, and processing circuitry operatively associated with the communication interface circuitry and configured to carry out the method described immediately above.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 4 is a logic flow diagram of an example method of processing implemented by a network node in a wireless communication network.

FIG. 5 is a logic flow diagram of an example method of processing implemented by another network node in a wireless communication network.

FIG. 6 is a logic flow diagram of an example method of processing implemented by yet another network node in a wireless communication network.

FIG. 7 is a logic flow diagram of an example method of processing implemented by yet another network node in the wireless communication network.

FIG. 11 is a data table in an example embodiment, for mapping Application Function/Application Server (AF/AS) Internet Protocol (IP) address to respective MTC SP identifiers.

FIG. 12 is a data table in an example embodiment, for identifying relevant external identifiers used for identifying MTC applications, based on the domains/subdomains associated with respective MTC SP networks.

DETAILED DESCRIPTION

In an example scenario, a wireless communication device (WCD) is associated with multiple Machine Type Communication (MTC) Service Provider (SP) networks. A wireless communication network (WCN) acts as an access network, communicatively coupling the WCD to the respective MTC SP networks. In at least certain types of communications, the multiple MTC SP networks use the same, and common identifier, to identify the WCD to the WCN. For example, the WCN includes an "network exposure function" that exposes certain network events involving the WCD, and any given one or more of the MTC SP networks may send requests to the WCN, requesting one or more configuration actions associated with the network exposure function.

Such requests use the common identifier, and the WCD is configured to determine the identity of the requesting provider, i.e., the MTC SP network associated with a given configuration action request, and to correspondingly restrict application of the configuration action to the requesting provider. Among the several advantages provided by such operations, all of the MTC SP networks can use the same common identifier, such as an external group identifier used to identify a defined group of WCDs or an MSISDN use to contact a particular WCD, to request configuration actions, with the WCN preventing a configuration action undertaken for one of the MTC SP networks from affecting behavior of the WCN with respect to the other MTC SP networks.

Figure 1:
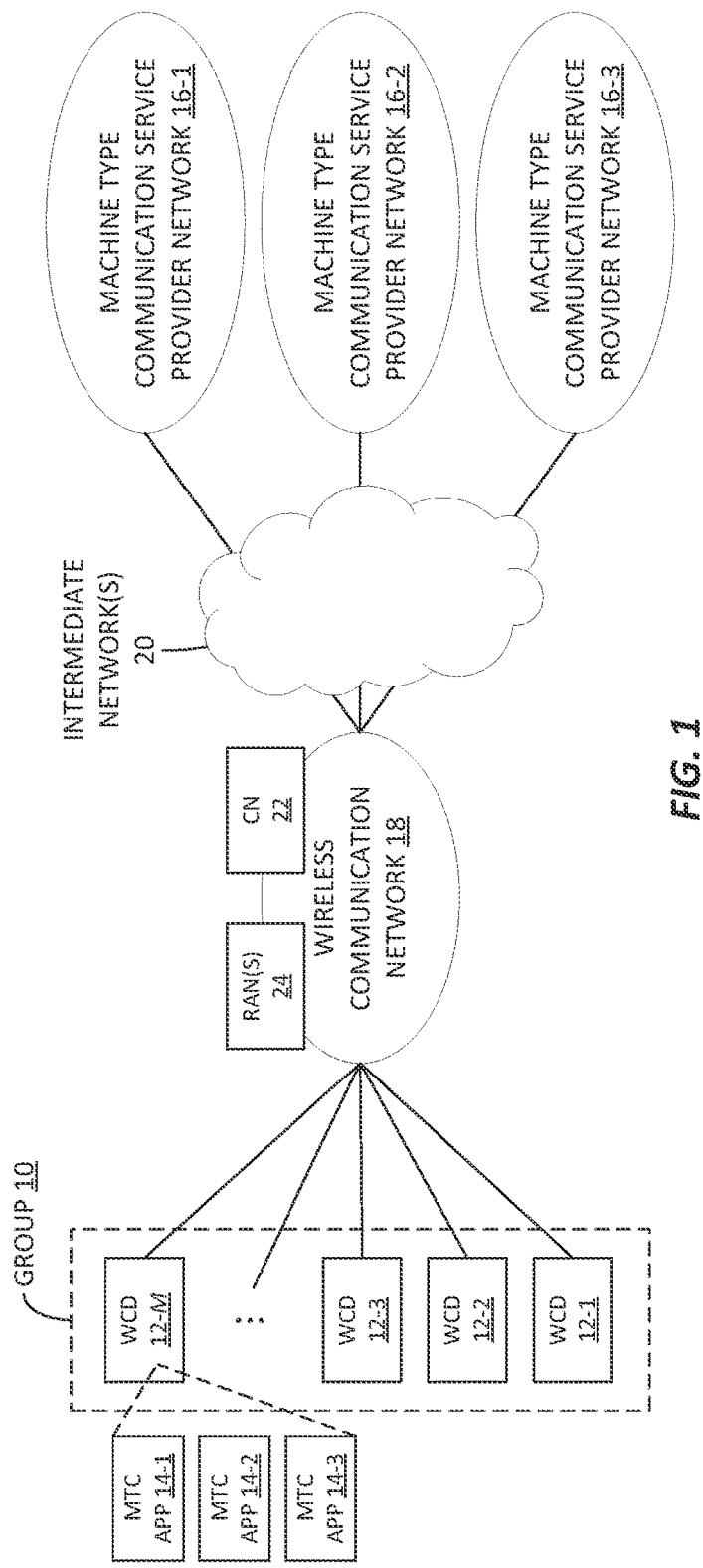
FIG. 1 is a block diagram of one embodiment of a wireless communication network that is operative as an access network for communicatively coupling a one or more wireless communication devices (WCDs) to respective Machine Type Communication (MTC) Service Provider (SP) networks.

With the non-limiting example scenario and advantages above in mind, FIG. 1 illustrates a group 10 of wireless communication devices (WCDs) 12, each hosting one or more distinct Machine Type Communication (MTC) applications or functions 14, hereafter broadly referred to as respective "MTC applications 14". Equivalently, each WCD 12 serves as a common communication interface for two or more MTC applications 14 hosted on physically separate systems or subsystems, which are not expressly shown in the diagram.

As a non-limiting example, the illustrated group 10 includes WCDs 12-1 through 12-M, with the M-th WCD 1 depicted as running three MTC applications 14-1, 14-2, and 14-3. Each of the other WCDs 12 in the group 10 may host respective copies of the same three MTC applications 14-1, 14-2, and 14-3.

However, the example arrangement does not imply any limitation that all WCDs 12 in the group 10 host identical sets of MTC applications 14. Further, unless clarity requires the use of suffixes, the reference number "12" refers to any given WCD or WCDs in the group 10 and the reference number 14 refers to any given MTC application or given MTC applications corresponding to any one or more of the WCDs 12 in the group 10.

In an example scenario, the different MTC applications 14 running on a given WCD 12 correspond to different MTC Service Providers (SPs), e.g., to different companies offering or using MTC services. In the illustrated context, for example, the MTC application 14-1 corresponds to a first MTC SP, represented in the diagram as MTC SP network 16-1, the MTC application 14-2 corresponds to a second MTC SP, represented in the diagram as MTC SP network 16-2, and the MTC application 14-3 corresponds to a third MTC SP, represented in the diagram as MTC SP network 16-3. Each WCD 12 in the group 10 may run two or more MTC applications 14, each corresponding to a different MTC SP and providing MTC-related functionality with respect to a corresponding one of the MTC SP networks 16. Unless the distinction is made for clarity, the terms "MTC SP" and "MTC SP network" may be used interchangeably.

Each WCD 12 comprises, for example, a cellular radio modem or other wireless communication circuitry, with local processing and interface circuitry for hosting the respective MTC applications 14, or for interfacing with "local" processing and interfacing systems or subsystems that host the respective MTC applications 14, In either case, the MTC applications 14 communicate with their respective MTC SP networks 16 through the WCD 12, using the illustrated wireless communication network 18 as an "access network". The MTC SP networks 16 may interface directly to the wireless communication network 18 or may interface through one or more intermediate networks 20.

The wireless communication network 18 comprises, for example, a cellular or other wide area network configured for operation according to Third Generation Partnership (3GPP) technical specifications. The intermediate network(s) 20 comprise, for example, the Internet or another Packet Data Network (PDN). Constituent portions of the wireless communication network 18 include a Core Network (CN) 22 that includes various nodes for interfacing the wireless communication network 18 to the intermediate network(s) 20, for managing "subscription" information and associated credentials that are used for authorizing network access by the respective WCDs 12, and for managing connectivity, communications, and mobility of the WCDs 12. The network 18 further includes one or more Radio Access Networks (RANs) 24, for communicatively coupling to respective ones of the WCDs 12 via one or more radio-based air interfaces.

As one example, the wireless communication network 18 comprises a so-called "4G" network operating according to the Long Term Evolution (LTE) technical specifications, where one or more of the RAN(s) 24 comprises an Evolved Universal Terrestrial Radio Access Network or E-UTRAN, and where the CN 22 comprises an Evolved Packet Core or EPC. In another example, the wireless communication network 18 comprises a so-called "5G" network, incorporating a New Radio (NR) air interface in at least one of the one or more RAN(s) 24.

In any case, as noted, the wireless communication network 18 serves as an access network enabling the MTC applications 14 to exchange data or control signaling with application servers or other nodes in the corresponding MTC SP networks 16. For example, a given MTC application 14 running on a given one of the WCDs 12 supports MTC functions or services in a given one of the MTC SP networks 16. Communications exchanged between the given MTC application 14 and the associated MTC SP network 16 flow through the wireless communication network 18, via a radio link established between the associated WCD 12 and a radio access node in one of the one or more RAN(s) 24. The wireless communication network 18 may include two or more RANs 18 of differing Radio Access Technologies (RATS), with corresponding supporting nodes included in the CN 22. As such, to the extent that example discussions herein use jargon or terminology associated with one particular network standard or another, such usage shall not be limiting unless expressly noted.

Among other things, the wireless communication network 18 in one or more examples supports any one or more of Mission Critical Communications (MCC) such as critical MTC services, Internet of Things (IoT) communications, including massive IoT deployments in which given external MTC SP networks 16 use the wireless communication network 18 to communicate with potentially large numbers of WCDs 12, which may be organized into one or more groups. As a non-limiting example, the groups of WCDs are defined according to geographic regions, or types of deployments, or according to some other logical grouping.

The group 10 denoted in FIG. 1 thus comprises a logical association of WCDs 12. In an example case, a wireless communication service provider associated with the wireless communication network 18 assigns individual WCDs 12 to act as a communication gateway or interface for various smart-metering applications in a respective residence, e.g., gas, water, and electric metering. The different metering functions may each be supported by a respective MTC application 14, with each MTC application 14 associated with a corresponding MTC SP network 16, and with the set of MTC applications 14 local to each residence aggregated under a respective one of the WCDs 12 in the group 10. In such cases, although each MTC SP network 16 interacts with a different MTC application 14 in each WCD 12 within the group 10, each MTC SP network 16 commonly uses the same external group identifier to identify the group 10 of WCDs 12 to the wireless communication network 18.

As noted in the "Background" section, each WCD 12 has an "internal identifier" that is used to identify the WCD 12 within the wireless communication network 18, such as for access control, authentication, and billing. In a non-limiting example, the internal identifiers are International Mobile Subscriber Identities or IMSIs. In another example case, the internal identifiers are Subscriber Permanent Identifiers (SUPIs), such as are defined for use in newer Fifth Generation (5G) networks. Security concerns or other concerns make it undesirable share the internal identifiers with the MTC SP networks 16. Rather than using the internal identifiers to identify the WCDs 12 that host or interface MTC applications 14 belonging to a given MTC SP network 16 each MTC SP network 16 identifies each such WCD 12 with a respective "external identifier."

While the mapping between the internal and external identifiers of a given WCD 12 must be provisioned in or learned by the wireless communication network 18, once such mappings are known, MTC data or control signaling nay pass between the wireless communication network 18 and a given MTC SP network 16, with the involved WCDs 12 being identified by the respective external identifiers. The various involved network nodes within the wireless communication network 18 "map" or "translate" between the external identifiers and the corresponding internal identifiers.

To direct signaling, requests, or other interactions to an entire group 10 of WCDs 12, the involved MTC SP network 16 uses the assigned external group identifier. As noted above, because each WCD 12 may run two or more MTC applications 14 associated with different MTC SP networks 16, all such MTC SP networks 16 will use the same external group identifier to identify the target group 10 of WCDs 12 to the wireless communication network 16.

Figure 2:
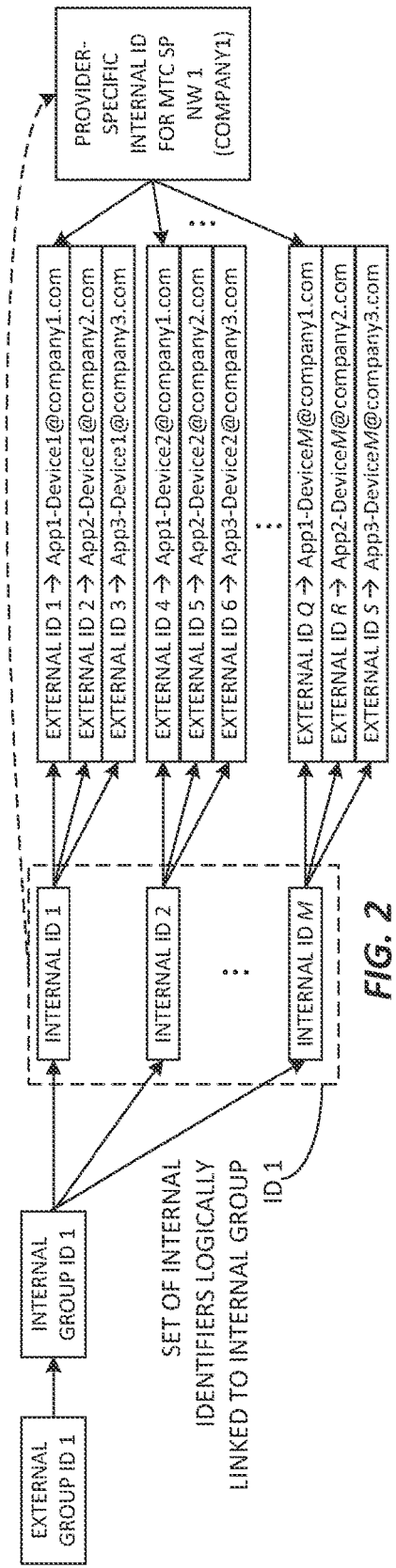
FIG. 2 is a diagram of one embodiment of a mapping or linking scheme that associates various "external" and "internal" identifiers used for translating between the identification scheme used to identify WCDs internally within a wireless communication network and the identification scheme used externally to identify respective MTC applications associated with the WCDs.

As seen in FIG. 2, provisioning information maintained in one or more databases in the wireless communication network 18 map the external group identifier to a corresponding "internal group identifier" that, in turn, is used within the wireless communication network 18 to logically associate or group the individual "internal identifiers" of the WCDs 12 together as a defined group 10. In other words, the wireless communication network 18 uses defined mapping information to look up the internal group identifier that corresponds to the external group identifier, such as may be received in signaling from one of the MTC SP networks 16, and then uses further defined mapping information to identify all IMSIs or other internal identifiers that are logically linked to the internal group identifier.

FIG. 2 also illustrates each internal identifier as being logically mapped to a set of external identifiers. For example, the internal identifier shown as "INTERNAL ID 1" in FIG. 2 is the IMSI or SUPI of a particular WCD 12. Three external identifiers are linked to INTERNAL ID 1, denoted as "EXTERNAL ID 1", "EXTERNAL ID 2", and "EXTERNAL ID 3". As seen each respective external identifier belongs to or corresponds with a different "company", where each such company may be understood as corresponding to a different MTC SP network 16.

As also explained in the "Background" section, certain interactions between a given MTC SP network 16 and a conventional wireless communication network involve the use of an external group identifier that identifies a targeted group of WCDS 12. However, the associated control signaling flows within the conventional wireless communication network do not convey or otherwise indicate the involved MTC SP network 16. As such, at certain key processing or decision points, the conventional wireless communication network has no mechanism for determining which external identifiers are implicated and, correspondingly, the conventional wireless communication network has no mechanism for implementing group-based processing and control behaviors that differentiate between the different MTC SP networks 16 that are associated with a given group of WCDs 12.

FIG. 2 illustrates one aspect of an advantageous approach to solving the above problem and others, based on the use of "provider-specific internal identifiers". A conventional internal group identifier provides a convenient link between an external group identifier or other external identifier that is used by more than one MTC SP network to identify the same WCD 12—and the internal identifiers used within the WCN 18 for authentication and access control of the WCDs 12 associated with the external group identifier. However, the conventional internal group identifier simply maps to the external group identifier and provides no mechanism for identifying the particular MTC SP network that, signaled the external group identifier. As such, it is contemplated herein, to store or otherwise generate provider-specific internal identifiers that linked to the internal identifiers of the involved WCDs 12 but are specific to respective MTC SP networks, such that they can be used to restrict actions taken by the WCN 18 to affect only the MTC SP network associated with a given one of the provider-specific internal identifiers, and to identify the specific external identifiers that are applicable to the associated MTC SP network.

It shall be understood that FIG. 2 illustrates an example provider-specific internal identifier fora given MTC SP network 16 denoted as "NW 1." Additional provider-specific internal identifiers would be used for the additional MTC SP networks 16. In the illustrated example, three different companies, or, more generally, three different MTC SP network 16 all use the same external group identifier, EXTERNAL GROUP ID 1, to refer to the same group of WCDs 12 represented by the internal identifiers ID 1 through ID M. Thus, a different provider-specific internal identifier may be stored or otherwise generated and used at various nodes within the WCN 18 to tailor configuration actions to a specific MTC SP network 16, and to identify—such as for reporting purposes the particular external identifiers corresponding to the MTC applications 14 associated with that specific MTC SP network 16.

Figure 3:
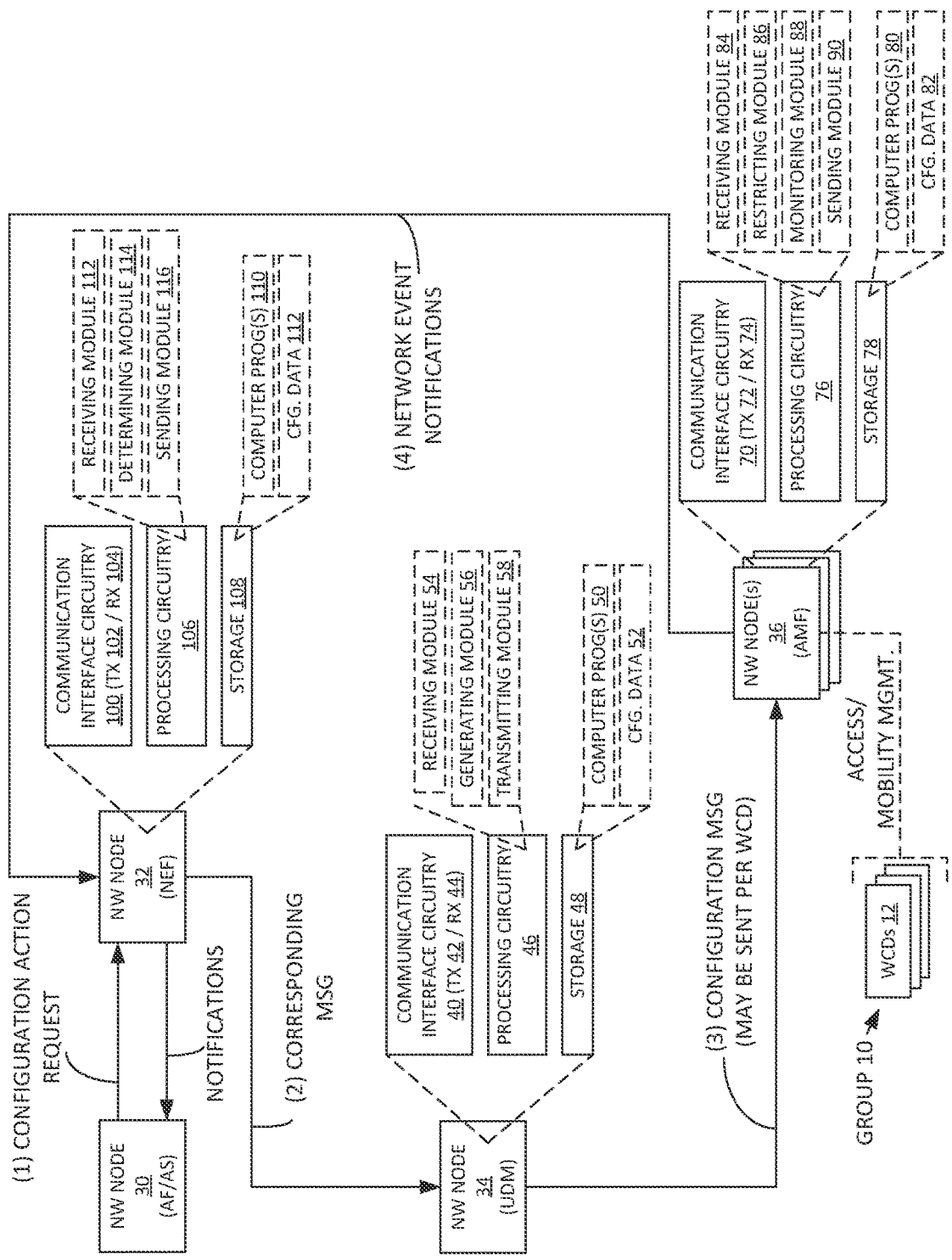
FIG. 3 is a block diagram of example embodiments of several network nodes implemented within a wireless communication network, such as the wireless communication network introduced in FIG. 1.

FIG. 3 illustrates a number of network nodes 32, 34, and 36 that cooperate to restrict the application of a requested configuration action, such that the configuration application is applied for the MTC SP network 16 that requested the configuration action or is otherwise associated with it, but not applied for the other MTC SP networks 16 that are commonly associated with the same WCDs 12 involved in the configuration action. Put another way, the WCN 18 restricts application of the configuration action in such a way that the corresponded behavior of the WCN 18 is not affected with respect to the other MTC SP networks 16.

As an advantageous example, consider a case where three MTC SP networks 16 are associated with the same WCD 12—the WCD 12 is associated with MTC applications 14 corresponding to each of the respective three MTC SP networks 16 and each MTC SP network 16 uses the same common external identifier to request configuration actions to be undertaken by the WCN 18 with respect to the WCD 12. Because the WCN 18 is contemplated herein determines the identity of the particular MTC SP network 16 that requests a particular configuration action, it can provide tailored configurations maintained individually with respect to each MTC SP network 16. For example, with respect to a particular type of network event, such as the reporting of lost connections or the retrieval of associated external identifiers, the WCN 18 allows each MTC SP network 16 to activate, modify, or terminate the corresponding network behavior on an individualized basis, with respect to each MTC SP network 16.

Turning to the illustrated example, the WCN 18 is associated with an "Application Function" or "Application Server" node, shown as "NW Node 30" in the diagram, annotated with "AF/AS" to denote its functional behavior. There may be multiple AF/AS nodes, e.g., with each one corresponding to or interfacing with a different MTC SP network 16.

The wireless communication network 18 also includes: a "Network Exposure Function", shown as "NW Node 32" in the diagram, annotated with "NEF" to denote its functional behavior; a "Unified Data Management" node, shown as "NW Node 34" in the diagram, annotated with "UDM" to denote its functional behavior; and an "Access and Mobility Function", shown as "NW Node 36" in the diagram, annotated with "AMF" to denote its functional behavior.

In an example processing and signal flow, the network node 30 sends a request message to the network node 32. The request is associated with a particular one of two or more MTC SP networks 16 that are commonly associated with a group 10 of WCDs 12. In an example scenario, the request requests a subscription—exposure—to a certain type of network event involving any of the WCDs 12 in the group 10, such as "loss of connection" events, or a request by an MTC SP network 16 for the external identifiers associated with an external group identifier, in which case the network 18 should expose only the external identifiers associated with requesting MTC SP network 16.

The network node 32 determines the identity of the particular M2M SP network 16 that is associated with the request, and it includes that identity in a corresponding message that it forwards to the network node 34. Including an indication of the identity of the MTC SP network 16 involved in the request in the message sent from the network node 32 to the network node 34 allows the network node 34 to determine the provider-specific internal identifier that is associated with the MTC SP network 16 involved in the request.

In turn, the provider-specific internal identifier provides a mechanism for the network node 34 to identify the external identifiers associated with the MTC SP network involved in the request—"the requesting provider". The network node 34 then sends one or more configuration messages to the one or more network nodes 36 that are responsible for undertaking the configuration action with respect to the involved WCDs 12. Each such network node 36 applies the configuration action (or initiates such application) as a function of the provider-specific internal identifier, and thereby restricts application of the configuration action to the requesting provider. Subsequent related signaling sent from each network node 36, such as network event notification signaling, advantageously uses, for each involved WCD 12 that the node 36 is responsible for, the specific external identifier corresponding to the requesting provider.

While the network nodes 32, 34, and 36 are shown as distributed, separate nodes, at least some of the involved functionality may be integrated together, or at least co-located in dependence on the particular arrangement used in the core-network portion of the wireless communication network 18. With such variations in mind, in an example implementation, the network node 34 is configured as a Unified Data Management (UDM) function and/or as a Home Subscriber Server (HSS).

Either way, the network node 34 is configured for operation in a wireless communication network 18 that serves as an access network for communicatively coupling WCDs 12 to respective MTC SP networks 16. The network node 34 includes communication interface circuitry 40 configured for communicating with one or more other network nodes 32, 36, in the wireless communication network 18. In an example implementation, the communication interface circuitry 40 comprises a computer data network interface, such as a Network interface Card or NIC implementing an Ethernet-based interface. Broadly, the communication interface circuitry 40 comprises one or more transmitter circuits 42 and one or more receiver circuits 44.

The network node 34 further includes processing circuitry 46 that is operatively associated with the communication circuitry 40 i.e., sends and receives messages or other signaling through the communication interface circuitry 40. Further, the processing circuitry is configured to carry out the method 400 shown in FIG. 4, e.g., based on being configured to perform a number of processing and control actions by which the method 400 is implemented.

The method 400 includes: receiving (Block 402) a network exposure function message, requesting a configuration action to be undertaken in the WCN 18 with respect to one or more WCDs 12 and identifying, as a requesting provider, one in a set of two or more MTC SP networks 16 that are commonly associated with the one or more WCDs 12 and external to the WCN 18. The method 400 further includes generating (Block 404) one or more configuration messages corresponding to the network exposure function message, each configuration message including a provider-specific internal identifier associated with the requesting provider, and transmitting (Block 406) the one or more configuration messages to one or more further network nodes 36 responsible for undertaking the configuration action, thereby restricting application of the configuration action by the one or more further network nodes 36 to the requesting provider.

In one embodiment, the method 400 further includes identifying, for each WCD 12 among the one or more WCDs 12, a corresponding external identifier of the requesting provider, and including the corresponding external identifier in a respective one of the one or more configuration messages that is sent to a further network node 36 among the one or more further network nodes 36 that is responsible for applying the configuration action with respect to the WCD.

In the same or another embodiment of the method 400, the network exposure function message includes a first identifier that is commonly used by all MTC SP networks 16 in the set of two or more MTC SP networks 16 to identify the one or more WCDs 12, and stored mapping information in the WCN 18 is used to maps the first identifier directly or indirectly to one or more internal identifiers, each internal identifier corresponding to one of the one or more WCDs 12 and used internally within the WCN 18 to identify the corresponding WCD 12 for authentication and access control. Further stored mapping information maps—links—each internal identifier to a corresponding set of external identifiers, each external identifier corresponding to one of the MTC SP networks 16 in the set of two or more MTC SP networks 16. Correspondingly, the method 400 in such embodiments includes identifying, for each WCD 12 among the one or more WCDs 12, the corresponding external identifier of the requesting provider using the further stored mapping information.

In the same embodiment or in a further embodiment of the method 400, the one or more WCDs 12 comprise a group 10 of WCDs 12 identified group-wise within the WCN 18 by an internal group identifier, and the first identifier is an external group identifier commonly used by all MTC SP networks 16 in the set of MTC SP networks 16 to identify the group 10 of WCDs 12. The stored mapping information maps the external group identifier to the internal group identifier and maps the internal group identifier to the corresponding internal identifiers of the WCDs 12. However, the provider-specific internal identifier corresponding to the MTC SP network 16 identified as the requesting provider replaces the internal group identifier for purposes of applying the configuration action with respect to the group 10 of WCDs 12, based on the provider-specific internal identifier being linked to the external identifiers associated with just the requesting provider.

In another example of carrying out the method 400, the first identifier is a Mobile Station International Subscriber Directory Number (MSISDN), wherein the one or more WCDs 12 comprise a WCD 12 corresponding to the MSISDN. In such cases, the stored mapping information maps the MSISDN to the corresponding internal identifier of the WCD 12 associated with the MSISDN.

Further with respect to the method 400, receiving the network exposure function comprises, in one or more examples, receiving the network exposure function message from a network node 32 operative as a network exposure function (NEF), the NEF being communicatively coupled with an Application unction (AF) or Application Server (AS) node e.g., the illustrated node 32 associated with the requesting provider.

FIG. 5 illustrates a further example method 500, such as may be implemented by a network node 34 having the circuit arrangement illustrated in FIG. 3 or having another arrangement of communication and processing circuitry supporting the operations embodied in the method 500. The method 500 in one or more embodiments is performed as an extension of the method 400, or otherwise represents network behavior corresponding to a configuration application applied according to the method 400.

Turning back to FIG. 3 for a moment, the network node 34 in one or more example embodiments implements the method 400 or 500 based on executing computer program instructions included in a computer program or programs 50 stored in the storage 48 that is included in the network node 34. The storage 48 comprises one or more types of non-transitory computer-readable media. For example, the storage 48 comprises volatile storage for program execution and working data, and nonvolatile storage for long-ter retention of the computer program or programs 50, and any items of configuration data 52 used by the network node 34—such items include, for example, the aforementioned stored mapping information.

Correspondingly, in such embodiments, the processing circuitry 46 comprises, at least in part, digital processing circuitry operative to execute computer program instructions, e.g., stored in machine-readable form in the storage 48. Non-limiting examples of digital processing circuitry include one or more microprocessors, microcontrollers, digital signal processors, FPGAs, or application-specific integrated circuits. Further, at least a portion of the processing circuitry 46 may be fixed rather than programmatically configured, i.e., it may comprise dedicated processing circuitry. To the extent that the processing circuitry 46 uses general-purpose processing circuits, it shall be understood that those processing circuits are specially adapted to carry out the functionality described herein, e.g., based on the execution of stored computer program instructions.

In a further example embodiment, the processing circuitry 46 implements a number of functional processing units or machine modules that are operative to carry out the method 400, or variations of the method 400. FIG. 3 depicts an example modular arrangement for the network node 34, including a receiving module 54 that is operative to carry out the operations in Block 402 of the method 400, a generating module 56 that is operative to carry out the operations in Block 404 of the method 400, and a transmitting module 58 that is operative to carry out the operations in Block 406.

Continuing with FIG. 3, each one of the network nodes 36 in an example embodiment includes communication interface circuitry 70, including one or more transmitter circuits 72 and one or more receiver circuits 74. Each such node 36 further includes processing circuitry 76 that is operatively associated with the communication circuitry. As noted, each node 36 may be operative as an Access and Mobility Function (AMF) in the WCN 18.

The communication interface circuitry 70 is configured for communicating with one or more other network nodes, e.g., other nodes 32 and 34, in the wireless communication network 18 and the processing circuitry 76 is, among other things, configured to implement the method 700 of operation depicted in FIG. 7.

The method 700 includes receiving (block 702) a first message from another network node 34. Such messages may also be referred to as "configuration messages." In any case, the first message indicates a configuration action to be undertaken by the network node 36 with respect to one or more WCDs 12. The configuration action relates to, for example, a network exposure function and the first message includes a provider-specific internal identifier corresponding to one in a set of two or more MTC SP networks 16 that are commonly associated with the one or more WCDs 12 and external to the WCN 18.

The method 700 further includes restricting (Block 704) application of the configuration action as a function of the provider-specific internal identifier, such that the configuration action affects the behavior of the WCN 18 with respect to the MTC SP network 16 corresponding to the provider-specific internal identifier but not with respect to the one or more other MTC SP networks 16 in the set of two or more MTC SP networks 16.

According to the method 700 in one or more embodiments, the configuration action is a network exposure function subscription request, requesting notification of network events involving at least one of the one or more WCDs 12. Further, the first message identifies each of the at least one WCDs 12 by a corresponding external identifier that is used by the MTC SP network 16 corresponding to the provider-specific internal identifier to identify a corresponding MTC application 14 that is associated with the WCD 12. Correspondingly, the method 700 includes reporting detected network events involving the at least one WCD 12, including sending, in each of one or more network event notification messages used to report the detected network events, the external identifier or identifiers corresponding to the at least one WCD 12.

The network node 36 in one or more example embodiments implements the method 700 based on executing computer program instructions included in a computer program or programs 80 stored in the storage 78 that is included in the network node 36. The storage 78 comprises one or more types of non-transitory computer-readable media. For example, the storage 78 comprises volatile storage for program execution and working data, and nonvolatile storage for long-term retention of the computer program or programs 80, and any items of configuration data 82 used by the network node 36.

Correspondingly, in such embodiments, the processing circuitry 76 comprises, at least in part, digital processing circuitry operative to execute computer program instructions, e.g., stored in machine-readable form in the storage 78. Non-limiting examples of digital processing circuitry include one or more microprocessors, microcontrollers, digital signal processors, FPGAs, or application-specific integrated circuits. Further, at least a portion of the processing circuitry 76 may be fixed rather than programmatically configured, i.e., it may comprise dedicated processing circuitry. To the extent that the processing circuitry 76 uses general-purpose processing circuits, it shall be understood that those processing circuits are specially adapted to carry out the functionality described herein, e.g., based on the execution of stored computer program instructions.

In a further example embodiment, the processing circuitry 76 implements a number of functional processing units or machine modules that are operative to carry out the method 700, or variations of the method 700. FIG. 3 depicts an example modular arrangement for the network node 36, including a receiving module 84 that is operative to carry out the operations in Block 702 of the method 700, and a restricting module 86 that is operative to carry out the operations in Block 704 of the method 700. The processing circuitry 76 also may implement a monitoring module 88 for detecting network events, and a sending module for reporting network events sending network event notifications.

The remaining network node of interest in FIG. 3, the network node 32, is operative as a NEF that is configured to "expose" network events of a certain type or types that involve one or more of the WCDs 12 in the group 10. As a non-limiting example, the network node 32, operating as a NEF, receives a request message from an Application Function (AF) or Application Server (AS) node, e.g., the illustrated network node 30, that requests a configuration action to be undertaken or otherwise applied in the wireless communication network 18, with respect to one or more WCDs 12 linked to a "first" identifier included in the request message. As noted, the first identifier is commonly used by more than one MTC SP network 16 to identify the same WCD(s) 12.

The network node 32 includes communication interface circuitry 100, including one or more transmitter circuits 102 and one or more receiver circuits 104. The communication interface circuitry 100 is configured for communicating with one or more other network nodes 30, 34, 36, in the wireless communication network 18, and the network node 32 further includes processing circuitry 106 that is operatively associated with the communication interface circuitry 100.

The processing circuitry 106 in one or more embodiments is configured to implement the method 600 depicted FIG. 6. The method 600 includes receiving (Block 602) a request message incoming from a requesting node 30 in or communicatively linked to the WCN 18. The message requests a configuration action to be undertaken by the WCN 18 on behalf of an unspecified one among a set of two or more MTC SP networks 16, with respect to one or more wireless communication devices WCDs 12 identified by a first identifier included in the message.

The method 600 further includes determining Block 604) an identity of the MTC SP network 16 associated with the request message. In one example, the determination is based on stored mapping information that maps at least one of authentication credentials and network address information for the requesting node 30 to a provider identifier identifying a corresponding one of the two or more MTC SP networks 16 in the set of two or more MTC SP networks. Further, the method includes sending (Block 606) a network exposure function message to a further network 34 node that is responsible for identifying the one or more WCDs (12) from the first identifier, for initiation of the configuration action. Here, the network exposure function message indicates the configuration action and the first identifier, and further indicates the provider identifier to thereby enable the further network node 34 to generate a corresponding configuration message for applying the configuration action only for the MTC SP network 16 corresponding to the provider identifier and not, for the remaining one or more MTC SP networks 16.

The network node 32 in one or more example embodiments implements the method 600 based on executing computer program instructions included in a computer program or programs 110 stored in the storage 108 that is included in the network node 32. The storage 108 comprises one or more types of non-transitory computer-readable media. For example, the storage 108 comprises volatile storage for program execution and working data, and nonvolatile storage for long-term retention of the computer program or programs 110, and any items of configuration data 112 used by the network node 32.

Correspondingly, in such embodiments, the processing circuitry 106 comprises, at least in part, digital processing circuitry operative to execute computer program instructions, e.g., stored in machine-readable form in the storage 108. Non-limiting examples of digital processing circuitry include one or more microprocessors, microcontrollers, digital signal processors, FPGAs, or application-specific integrated circuits. Further, at least a portion of the processing circuitry 106 may be fixed rather than programmatically configured, i.e., it may comprise dedicated processing circuitry. To the extent that the processing circuitry 106 uses general-purpose processing circuits, it shall be understood that those processing circuits are specially adapted to carry out the functionality described herein, e.g., based on the execution of stored computer program instructions.

In a further example embodiment, the processing circuitry 106 implements a number of functional processing units or machine modules that are operative to carry out the method 600, or variations of the method 600. FIG. 3 depicts an example modular arrangement for the network node 32, including a receiving module 112 that is operative to carry out the operations in Block 602 of the method 600, a determining module 114 that is operative to carry out the operations in Block 604 of the method 600, and a sending module 116 that is operative to carry out the operations in Block 606 of the method 600.

Figure 8:
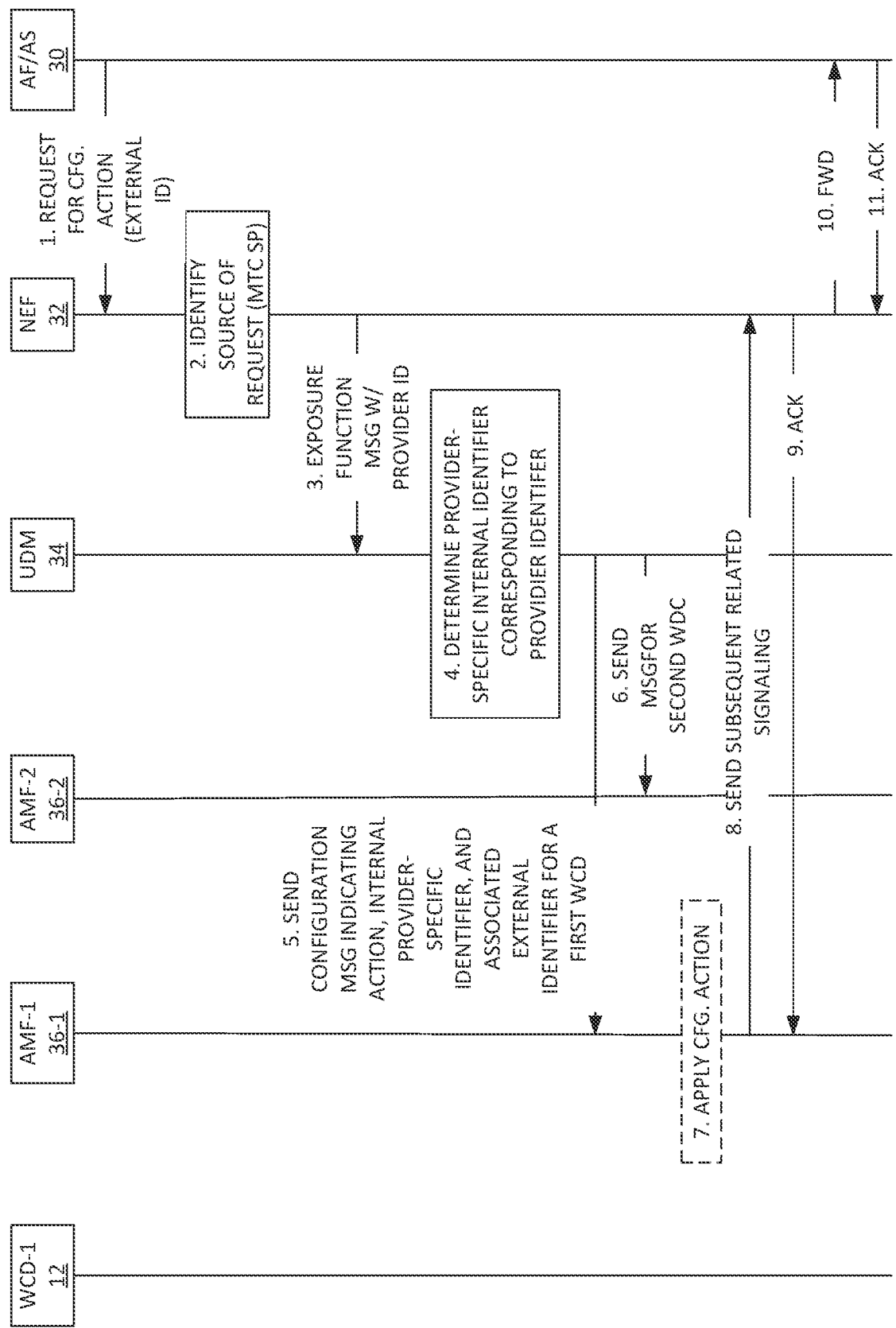
FIG. 8 is a signal flow diagram of an example signal flow involving network nodes within a wireless communication network.

FIG. 8 illustrates an example signal flow between the network nodes 32, 34, and 36, with the additional network node 30 included for context. The network node 30 is operative as an AF/AS node and associated with a respective MTC SP network 16, for example. The network node 32 is operative as a NEF, the network node 34 is operative as a UDM node, and the network nodes 36-1 and 36-2 are operative as respective AMFs labeled as AMF-1 and AMF-2.

At step 1, the AF/AS node 30 sends request message to the NEF 32. The request includes an external identifier and requests a configuration action. The external identifier is used by more than one MTC SP network 16 to identify the same WCD 12 or group 10 of WCDs 12 to the WCN 18 and the configuration action is, for example, a subscription request for notifications regarding a certain type of events involving the WCD(s) identified by the external identifier.

At step 2, the NEF 32 identifies the source of the request—i.e., it identifies which MTC SP network 16 is associated with the request.

At step 3, The NEF sends a corresponding message, which may be referred to as a network exposure function message, towards the UDM node 34, which may comprise the NEF forwarding the request towards the UDM node 34, or otherwise forwarding information associated with the request. In an example embodiment, the NEF forwards the external identifier included in the request, an indication of the configuration action, and a provider identifier, identifying the MTC SP network 16 associated with the request—the "requesting provider". The NEF may also include a configurable window for application of the configuration action or behavior flowing from the configuration action, such as 24 hours, 48 hours, or some other specified period.

At step 4, The UDM node 34 determines a provider-specific internal identifier corresponding to the provider identifier included in the message received from the NEF 32. The provider-specific internal identifier maps to the internal identifier of each WCD 12 associated with the external identifier included in the request received by the NEF 32 from the AF/AS node 30, and further maps to or provides a basis for identifying, for each involved WCD 12, the external identifier(s) associated with the requesting provider.

While the external identifier received by the NEF 32 from the AF/AS 30 may, in some cases, map to a single WCD 12, e.g., such as when the external identifier is an MSISDN, the illustrated example in FIG. 8 assumes that the external identifier is an external group identifier that maps to a group 10 of at least two WCDs 12—a first WCD 12 and a second 12. Further, the example assumes that the first WCD 12 is associated with a first AMF node 36, shown as AMF-1, and that the second WCD 12 is associated with a second AMF node 36, shown as AMF-2. In other words, in the illustrated scenario, the AMF-1 is responsible for the first WCD 12 and the AMF-2 is responsible for the second WCD 12.

At step 5, the UDM node 34 sends a configuration message to the AMF-1, for applying the configuration action in a provider-specific manner. Specifically, the configuration message sent to AMF-1 indicates the configuration action to be applied and indicates the internal provider-specific identifier corresponding to the requesting provider, and further indicates the external identifier that is associated with the first WCD 12 in correspondence with the requesting provider. That is, the first WCD 12 is associated with two or more MTC applications 14, each corresponding to a different MTC SP network 16 and identified by a corresponding external identifier used by the corresponding MTC SP network 16. The configuration message sent at step 5 to AMF-1 thus includes the external identifier of the MTC application 14 that is associated with the first WCD 12 and corresponds to the MTC SP network 16 identified as the requesting provider. The configuration message sent at step 6 is similar, except that it goes to the AMF-2, which is responsible for the second WCD 12, and it includes the applicable external identifier associated with the second WCD 12.

At step 7, the AMF-1 applies the configuration action as a function of the indicated provider-specific internal identifier. As such, the configuration action applies only to the MTC SP network 16 earlier identified as the requesting provider. Therefore, step 8 can be understood as the AMF-1 sending subsequent signaling that is related to the restricted application of the configuration action.

For example, if the configuration action was a subscription request, requesting network event notifications for a particular type of network event available for exposure via the NEF 32, the signaling in step 8 comprises a network event notification, based on monitoring for and detection of the network event by the AMF-1, or a supporting node that, is not shown. Advantageously, the network event notification targets the NEF 32 and, for the WCD 12 involved in the detected event—here, the first WCD 12—it includes the external identifier applicable to the MTC SP network 16 earlier identified as the requesting provider. Such inclusion allows the NEF 32 to report the detected event with the external identifier that is applicable to the MTC SP network 16 that originally requested the configuration action. Similar operations may be performed by the AMF-2 with respect to event detections involving the second WCD 12.

Figure 9:
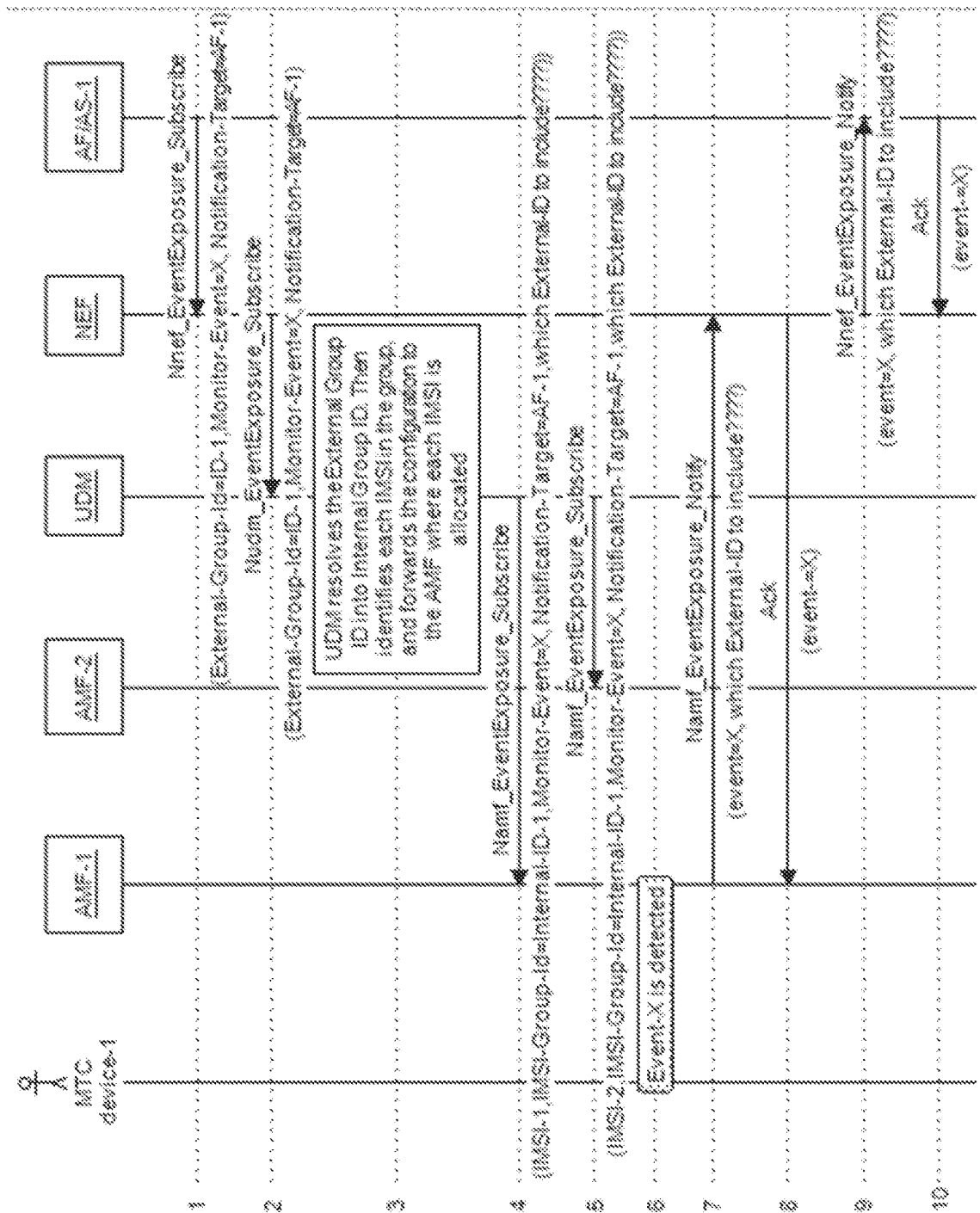
FIGS. 9 and 10 are further signal flow diagrams involving the specific example of a subscription request, and with FIG. 9 illustrating one or more corresponding problems arising in network operations that are resolved in the example signaling flow of FIG. 10.
Figure 10:
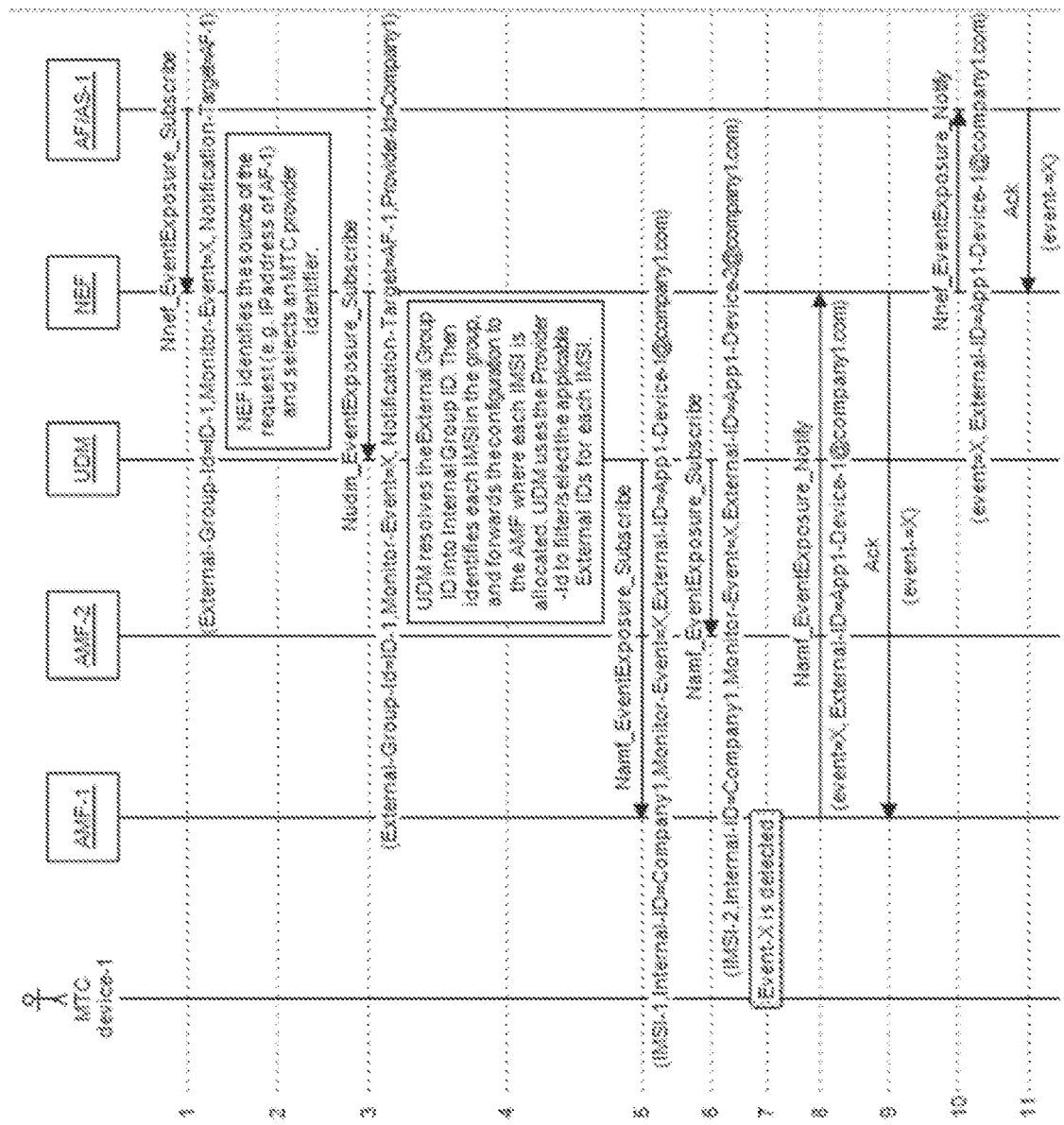

FIGS. 9 and 10 are further signal flow diagrams involving the specific example of a subscription request, and with FIG. 9 illustrating one or more corresponding problems arising in network operations that are resolved in the example signaling flow of FIG. 10. That is, FIG. 10 can be understood as a specific example of the configuration action and attendant network behavior suggested in FIG. 8, whereas FIG. 9 highlights one or more problems in a conventional corresponding signaling flow practiced without benefit of the provider-specific internal identifiers described herein. In that regard, note that an example provider-specific internal identifier is seen as "Internal-ID=Company1" in steps 5 and 6 in FIG. 10.

In more detail, in step 5 in FIG. 10, the configuration message sent from the UDM to AMF-1 indicates the IMSI of the involved WCD 12 as "IMSI-1". The provider-specific internal identifier used to restrict application of the configuration function is "Internal-ID=Company1", the type of network event to be monitored for with regard to the WCD 12 identified by IMSI-1 is given as "Event=X", and the external identifier used by Company1 to identify the associated MTC application 14 on the WCD 12 identified by IMSI-1 is given as External-ID=App1-Device1@company1.com". As such, the AMF-1 monitors for network events of type X that involve the WCD 12 identified by IMSI-1, and it sends corresponding event notifications that include the applicable external identifier, so that Company1 can be informed of the MTC application 14 affected by or involved in the detected network event. Similar details apply for the WCD 12 identified by IMSI-2, but they are not shown in FIG. 10, FIG. 11 is an example data table used to map network domains to respective provider identifiers, with each provider identifier identifying the MTC SP network 16 associated with the respective network domain(s). FIG. 12 illustrates an example data table used to map MTC SP identifiers to the domains(s)/subdomains(s) of the corresponding MTC SP networks 16. As such, in one or more embodiments, the example UDM node 34 uses the domain/subdomain information to discern which external identifiers corresponding to the MTC SP network 16 that is associated with the event subscription being configured.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method for applying configuration actions in a wireless communication network (WCN), the method comprising:
   receiving, by a first network node of the WCN, an exposure function message requesting a configuration action to be undertaken in the WCN with respect to one or more wireless communication devices (WCDs) and identifying, as a requesting provider, one in a set of two or more Machine Type Communication (MTC) Service Provider (SP) networks that are commonly associated with the one or more WCDs and external to the WCN;
   generating, by the first network node, one or more configuration messages corresponding to the network exposure function message, each configuration message including a provider-specific internal identifier associated with the requesting provider;
   transmitting, by the first network node, the one or more configuration messages to one or more second network nodes of the WCN responsible for undertaking the configuration action;
   receiving, by the one or more second network nodes, the one or more configuration messages; and
   restricting, by the one or more second network nodes, application of the configuration action as a function of the provider-specific internal identifier, such that the configuration action affects the behavior of the WCN with respect to the MTC SP network corresponding to the provider-specific internal identifier but not with respect to the one or more other MTC SP networks in the set of two or more MTC SP networks.

2. The method of claim 1, further comprising:
   receiving, by a third network node of the WCN, a request message incoming from a requesting node in or communicatively linked to the WCN, the message requesting a configuration action to be undertaken by the WCN on behalf of an unspecified one among the set of two or more MTC SP networks, with respect to one or more WCDs identified by a first identifier included in the message;
   determining, by the third network node, an identity of the MTC SP network associated with the request message, based on further stored mapping information that maps at least one of authentication credentials and network address information for the requesting node to a provider identifier identifying a corresponding one of the two or more MTC SP networks in the set of two or more MTC SP networks; and
   sending, by the third network node, the network exposure function message to the first network node, the network exposure function message indicating the configuration action and the first identifier, and further indicating the provider identifier.

3. The method of claim 1, further comprising identifying, by the first network node, for each WCD among the one or more WCDs, a corresponding external identifier of the requesting provider, and including the corresponding external identifier in a respective one of the one or more configuration messages that is sent to a further network node among the one or more further network nodes that is responsible for applying the configuration action with respect to the WCD.

4. The method of claim 1, wherein the network exposure function message includes a first identifier that is commonly used by all MTC SP networks in the set of two or more MTC SP networks to identify the one or more WCDs, and wherein stored mapping information in the WCN maps the first identifier directly or indirectly to one or more internal identifiers, each internal identifier corresponding to one of the one or more WCDs and used internally within the WCN to identify the corresponding WCD for authentication and access control, and wherein further stored mapping information maps each internal identifier to a corresponding set of external identifiers, each external identifier corresponding to one of the MTC SP networks in the set of two or more MTC SP networks, and wherein the method includes identifying, for each WCD among the one or more WCDs, the corresponding external identifier of the requesting provider using the further stored mapping information.

5. The method of claim 4, wherein the one or more WCDs comprise a group of WCDs identified group-wise within the network by an internal group identifier, wherein the first identifier is an external group identifier commonly used by all MTC SP networks in the set of MTC SP networks to identify the group of WCDs, and wherein the stored mapping information maps the external group identifier to the internal group identifier and maps the internal group identifier to the corresponding internal identifiers of the WCDs, and further wherein the provider-specific internal identifier replaces the internal group identifier for purposes of applying the configuration action with respect to the group of WCDs, based on the provider-specific internal identifier being linked to the external identifiers associated with the requesting provider.

6. The method of claim 1, wherein the configuration action is a network exposure function subscription request, requesting notification of network events involving at least one of the one or more WCDs, the first message identifying each of the at least one WCDs by a corresponding external identifier that is used by the MTC SP network corresponding to the provider-specific internal identifier to identify a corresponding MTC application that is associated with the WCD, the method further comprising reporting, by the one or more second network nodes, detected network events involving the at least one WCD, including sending, in each of one or more network event notification messages used to report the detected network events, the external identifier or identifiers corresponding to the at least one WCD.

7. A wireless communication network (WCN) comprising:
a first network node comprising:
communication interface circuitry for communicating with one or more other nodes in or communicatively coupled to the WCN; and
processing circuitry operatively associated with the communication interface circuitry and configured to:
receive an exposure function message requesting a configuration action to be undertaken in the WCN with respect to one or more wireless communication devices (WCDs),
identify, as a requesting provider, one in a set of two or more Machine Type Communication (MTC) Service Provider (SP) networks that are commonly associated with the one or more WCDs and external to the WCN,
generate one or more configuration messages corresponding to the network exposure function message, each configuration message including a provider-specific internal identifier associated with the requesting provider and
transmit the one or more configuration messages to one or more second network nodes of the WCN responsible for undertaking the configuration action; and
a second network node comprising:
communication interface circuitry for communicating with one or more other nodes in or communicatively coupled to the WCN; and
processing circuitry operatively associated with the communication interface circuitry and configured to
receive the configuration message transmitted by the first network node and
restrict application of the configuration action as a function of the provider-specific internal identifier, such that the configuration action affects the behavior of the WCN with respect to the MTC SP network corresponding to the provider-specific internal identifier but not with respect to the one or more other MTC SP networks in the set of two or more MTC SP networks.

8. The WCN according to claim 7, further comprising:
a third network node comprising communication interface circuitry for communicating with one or more other nodes in or communicatively coupled to the WCN; and
processing circuitry operatively associated with the communication interface circuitry and configured to:
receive a request message incoming from a requesting node in or communicatively linked to the WCN, the message requesting a configuration action to be undertaken by the WCN on behalf of an unspecified one among the set of two or more MTC SP networks, with respect to one or more WCDs identified by a first identifier included in the message;
determine an identity of the MTC SP network associated with the request message, based on further stored mapping information that maps at least one of authentication credentials and network address information for the requesting node to a provider identifier identifying a corresponding MTC SP network in the set of two or more MTC SP networks; and
send the network exposure function message to the first network node, the network exposure function message indicating the configuration action and the first identifier, and further indicating the provider identifier.

9. The WCN according to claim 8, wherein the third network node is operative as a network exposure function (NEF), the NEF communicatively coupled with an Application Function (AF) or Application Server (AS) node associated with the requesting provider.

10. The WCN according to claim 7, wherein the processing circuitry of the first network node is configured to:
identify, for each WCD among the one or more WCDs, a corresponding external identifier of the requesting provider, and
include the corresponding external identifier in a respective one of the one or more configuration messages that is sent to the one or more second network nodes that is responsible for applying the configuration action with respect to the WCD.

* * * * *